United States Patent
Sun et al.

(10) Patent No.: US 11,940,559 B2
(45) Date of Patent: Mar. 26, 2024

(54) LIGHT DETECTION AND RANGE (LIDAR) DEVICE WITH COMPONENT STACKING FOR COAXIAL READOUT WITHOUT SPLITTER MIRROR FOR AUTONOMOUS DRIVING VEHICLES

(71) Applicant: Baidu USA LLC, Sunnyvale, CA (US)

(72) Inventors: Tianjia Sun, Sunnyvale, CA (US); Yaoming Shen, Sunnyvale, CA (US); Xiangfei Zhou, Sunnyvale, CA (US); Yang Han, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 1056 days.

(21) Appl. No.: 16/216,780

(22) Filed: Dec. 11, 2018

(65) Prior Publication Data

US 2020/0182972 A1    Jun. 11, 2020

(51) Int. Cl.
  *G01S 7/481*    (2006.01)
  *G01S 17/931*   (2020.01)

(52) U.S. Cl.
  CPC .......... *G01S 7/4812* (2013.01); *G01S 17/931* (2020.01)

(58) Field of Classification Search
  CPC .............................. G01S 7/4812; G01S 17/931
  See application file for complete search history.

(56) References Cited

U.S. PATENT DOCUMENTS

| | | | | |
|---|---|---|---|---|
| 6,072,763 A | * | 6/2000 | Takahashi | .......... G11B 7/13922 |
| 2001/0007543 A1 | * | 7/2001 | Tanaka | ................... G11B 7/123 |
| 2017/0124476 A1 | * | 5/2017 | Levinson | ............... G06V 20/58 |
| 2018/0164439 A1 | | 6/2018 | Droz et al. | |
| 2019/0011567 A1 | * | 1/2019 | Pacala | ................... G01S 7/4863 |
| 2019/0146064 A1 | * | 5/2019 | Hansson | ............... G01S 7/4876 356/5.01 |
| 2020/0142034 A1 | * | 5/2020 | Shepard | ................ G01S 7/4863 |
| 2021/0384703 A1 | * | 12/2021 | Watkins | .................. H01S 5/005 |

FOREIGN PATENT DOCUMENTS

| | | | | |
|---|---|---|---|---|
| CN | 1967285 A | | 5/2007 | |
| CN | 102227612 A | | 10/2011 | |
| CN | 207457508 U | | 6/2018 | |
| CN | 108450025 A | | 8/2018 | |
| CN | 108663682 A | | 10/2018 | |
| JP | 08094755 A | | 4/1996 | |
| JP | 2009008404 A | * | 1/2009 | |

\* cited by examiner

*Primary Examiner* — Hovhannes Baghdasaryan
*Assistant Examiner* — Benjamin Richard Hebert
(74) *Attorney, Agent, or Firm* — WOMBLE BOND DICKINSON (US) LLP

(57) ABSTRACT

In one embodiment, a light detection and range (LIDAR) device includes an array of light transmitting and receiving (TX/RX) units arranged to sense a physical range associated with a target. Each of the light TX/RX units includes a mounting board having a light pass-through opening and a light emitter mounted adjacent to the light pass-through opening. The light emitter is configured to emit a light beam towards the target according to a transmitting path. The LIDAR device further includes a light detector positioned behind the mounting board to receive at least a portion of the light beam reflected from the target through the light pass-through opening according to a light receiving path. The light transmitting path and the light receiving path are substantially in parallel and close to each other.

12 Claims, 8 Drawing Sheets

LIGHT DETECTION AND RANGE (LIDAR) DEVICE WITH COMPONENT STACKING FOR COAXIAL READOUT WITHOUT SPLITTER MIRROR FOR AUTONOMOUS DRIVING VEHICLES

TECHNICAL FIELD

Embodiments of the present disclosure relate generally to operating autonomous driving vehicles. More particularly, embodiments of the disclosure relate to a LIDAR device utilized in autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR techniques have been widely utilized in military, geography, oceanography, and in the latest decade, autonomous driving vehicles. Apart from others, LIDAR's applications in autonomous driving vehicles have been hindered by the high cost. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers can be rapidly and repeatedly scanned across a scene to provide continuous real-time information on distances to reflective objects in the scene.

A traditional LIDAR device typically includes a transmitting and a receiving sensor disposed at different locations of different light paths. It utilizes a light splitter to transmit light from the transmitter and deflect the received light using the splitter mirror to the receiver. Such a configuration tends to be large in size. It is also difficult to align the received light to the receiver. Given that a LIDAR device can have multiple transmitter and receiver pairs, it makes the alignment even harder and the physical size even larger.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
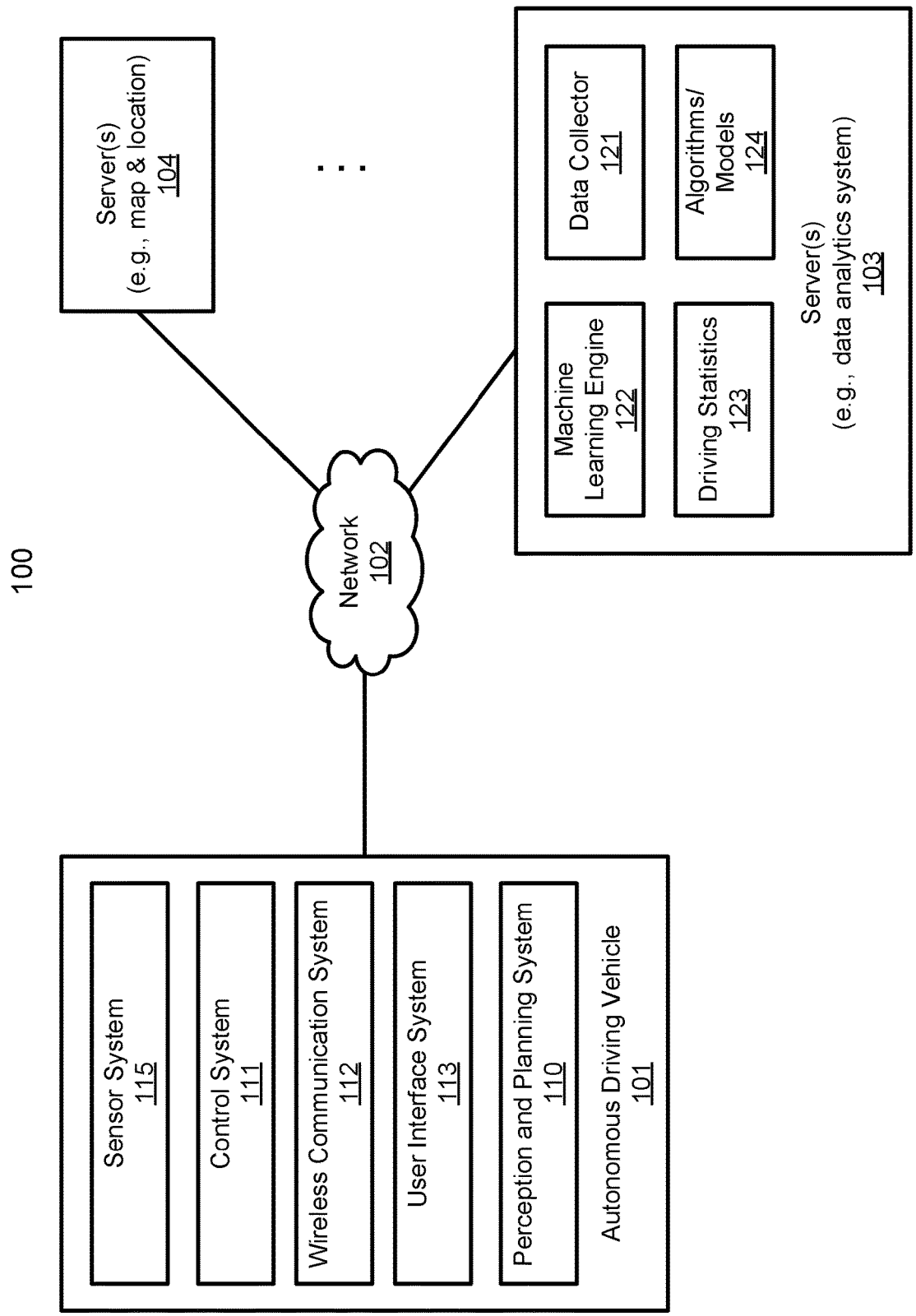
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the invention are to position a light transmitter and a light receiver on the same light path. As a result, the received light can be easily or accurately aligned to a light detector or sensor. In addition, the physical size of the LIDAR device can be made smaller.

According to one aspect, a light detection and range (LIDAR) device includes an array of light transmitting and receiving (TX/RX) units arranged to sense a physical range associated with a target. Each of the light TX/RX units includes a mounting board having a light pass-through opening (or window) and a light emitter mounted adjacent to the light pass-through opening. The light emitter is configured to emit a light beam towards the target according to a transmitting path. The LIDAR device further includes a light detector positioned behind the mounting board to receive at least a portion of the light beam reflected from the target through the light pass-through opening according to a light receiving path. The light transmitting path and the light receiving path are substantially in parallel and close to or overlapped with each other, such that the light pass-through opening, as well as the TX/RX unit, can be made smaller.

In one embodiment, each TX/RX unit further includes a first collimating lens disposed between the target and the light emitter. The first collimating lens is configured to diverge the light beam from the light emitter towards the target. The first collimating lens is further configured to collapse at least a portion of the reflected light beam received from the target, such that the reflected light beam can pass through the light pass-through opening to reach the light detector.

In one embodiment, each light TX/RX unit further includes a second collimating lens positioned between the mounting board and the light detector. The second collimating lens is configured to receive the reflected light from the first collimating lens through the pass-through opening of the mounting board and to transform the reflected light from various angles to parallel light towards the light detector. According to a further embodiment, each light TX/RX unit further includes a third collimating lens positioned between the second collimating lens and the light detector. The third collimating lens is configured to collapse the light received from the second collimating lens to concentrate and focus onto the light detector.

According to another aspect of the invention, an ADV includes a LIDAR device as described above and a perception and planning system. The perception and planning system is configured to perceive a driving environment surrounding the ADV based on LIDAR sensor data provided by the LIDAR device and to control the ADV to navigate through the driving environment.

According to a further aspect of the invention, a process to operating a LIDAR device includes providing an array of light transmitting and receiving (TX/RX) units to sense a physical range associated with a target. For each of the light TX/RX units, the process includes providing a mounting board having a light pass-through opening and emitting a light beam using a light emitter mounted on the mounting board adjacent to the light pass-through opening. The light emitter is configured to emit the light beam towards the target according to a transmitting path. The process further includes receiving using a light detector positioned behind the mounting board at least a portion of the light beam reflected from the target through the light pass-through opening according to a light receiving path. The light transmitting path and the light receiving path are substantially in parallel and close to each other.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in-an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
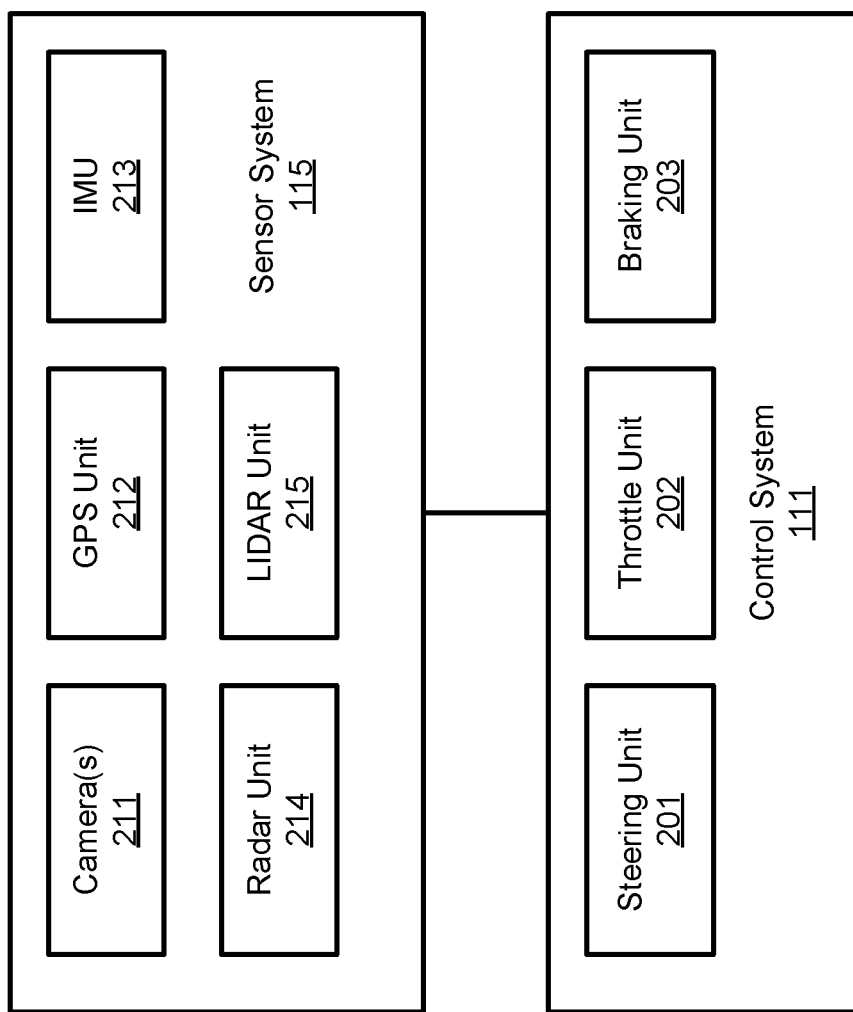
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to process LIDAR sensor data for perception using a LIDAR device described throughout this application. Algorithms 124 can then be uploaded on ADVs to be utilized during autonomous driving in real-time.

Figure 3:
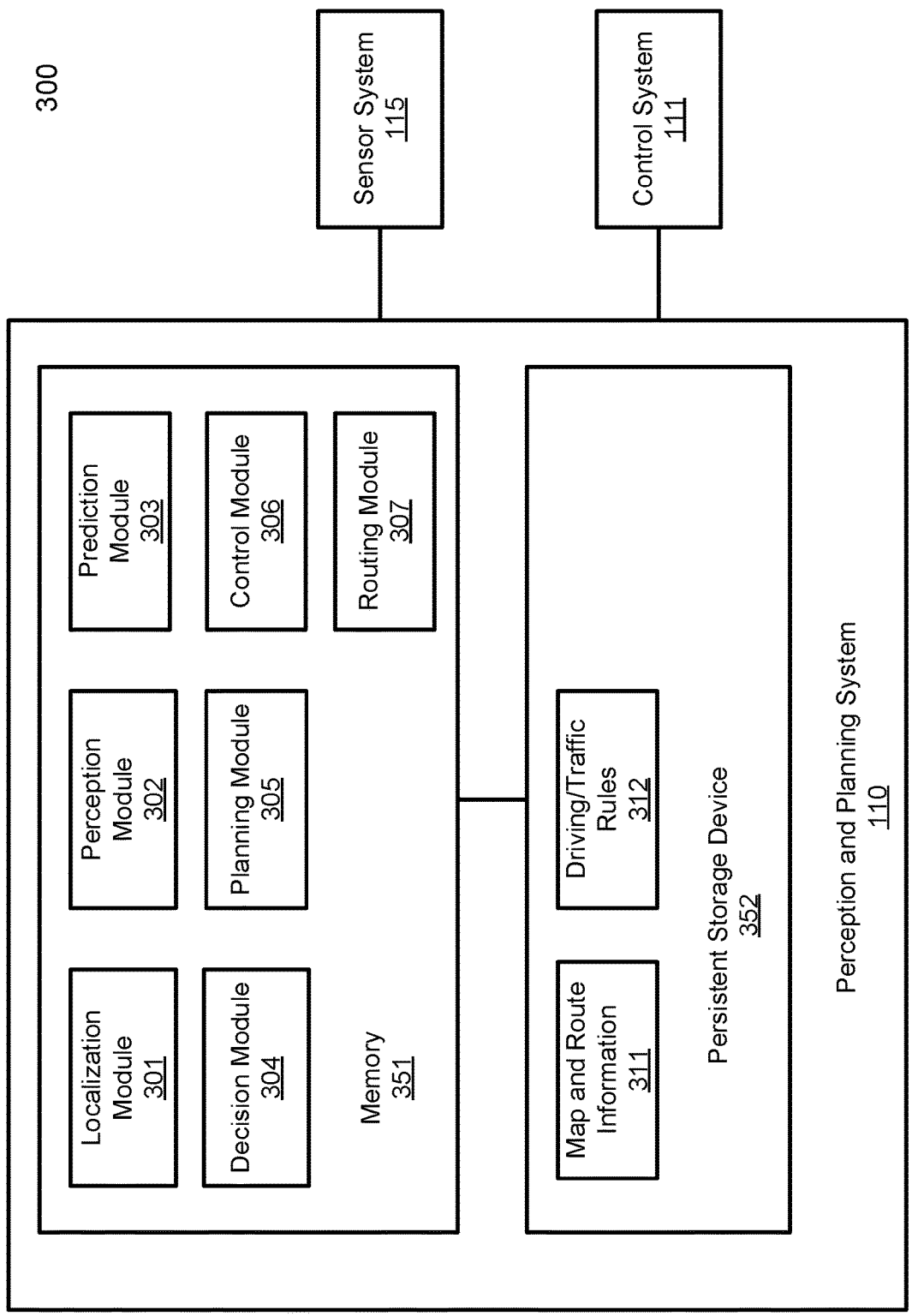
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
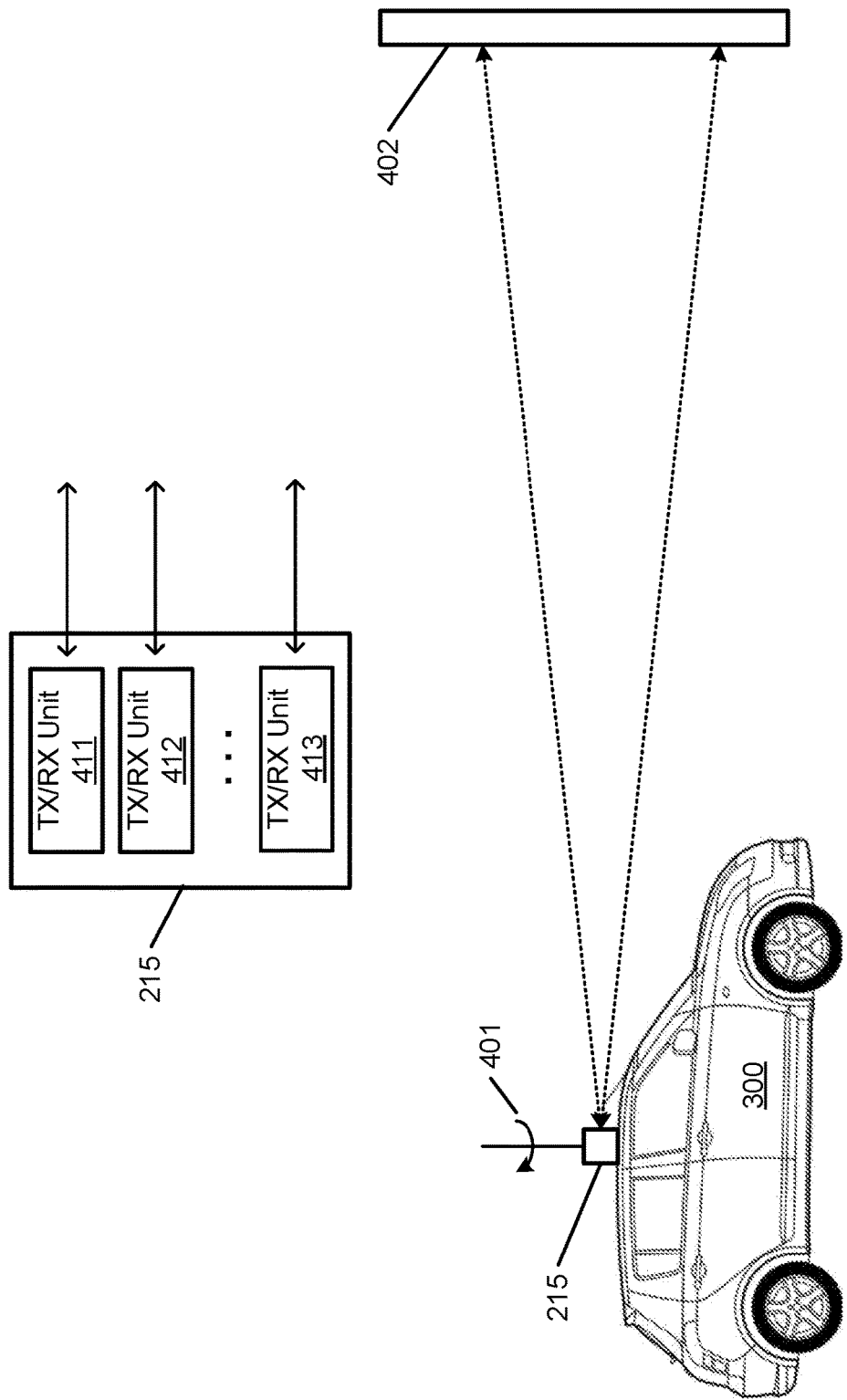
FIG. 4 shows a typical LIDAR mounting configuration.

FIG. 4 shows a typical LIDAR configuration with respect to an autonomous driving vehicle. As shown in FIG. 4, LIDAR device 215 is typically mounted on the top of ADV 300. The LIDAR device is configured to spin horizontally and vertically, for example, according to spinning direction 401, such that LIDAR device 215 can scan the entire 360 degree environment. LIDAR device 215 includes at least one light emitter therein (not shown) to emit a light beam towards target 402. LIDAR device 215 further includes at least one light detector or light sensor (not shown) to receive and detect the light beam reflected from target 402. In one embodiment, LIDAR device 215 includes an array of one or more TX/RX units 411-413 arranged to emit light towards a target and receive light reflected from the target. Each of TX/RX units 411-413 includes at least one light emitter to emit light and at least one light sensor to receive and sense light.

Figure 5:
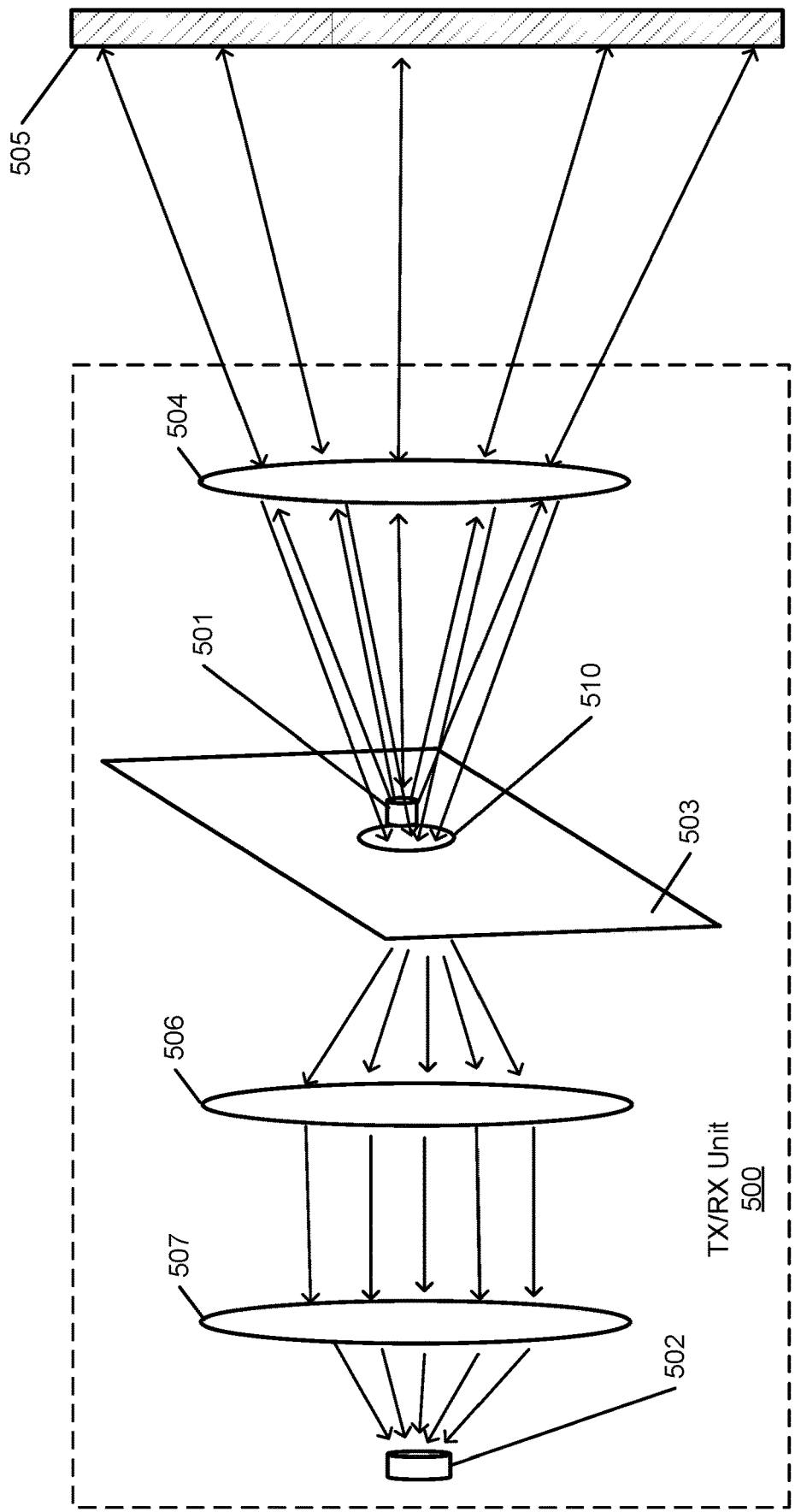
FIG. 5 shows a perspective view of a transmitting and receiving unit of a LIDAR device according to one embodiment.

FIG. 5 is shows a perspective view of a TX/RX unit of a LIDAR device configuration according to one embodiment. TX/RX unit 500 may represent any of the LIDAR devices described above, such as, for example, TX/RX units 411-413. Referring to FIG. 5, in one embodiment, TX/RX unit 500 includes at least one light emitter 501 and at least one light detector 502. Light emitter 501 may be mounted on a mounting board 503 such as a printed circuit board (PCB). The PCB may include circuitry coupling light emitter 501 to other LIDAR components such as a LIDAR controller (not shown).

Figure 6A:
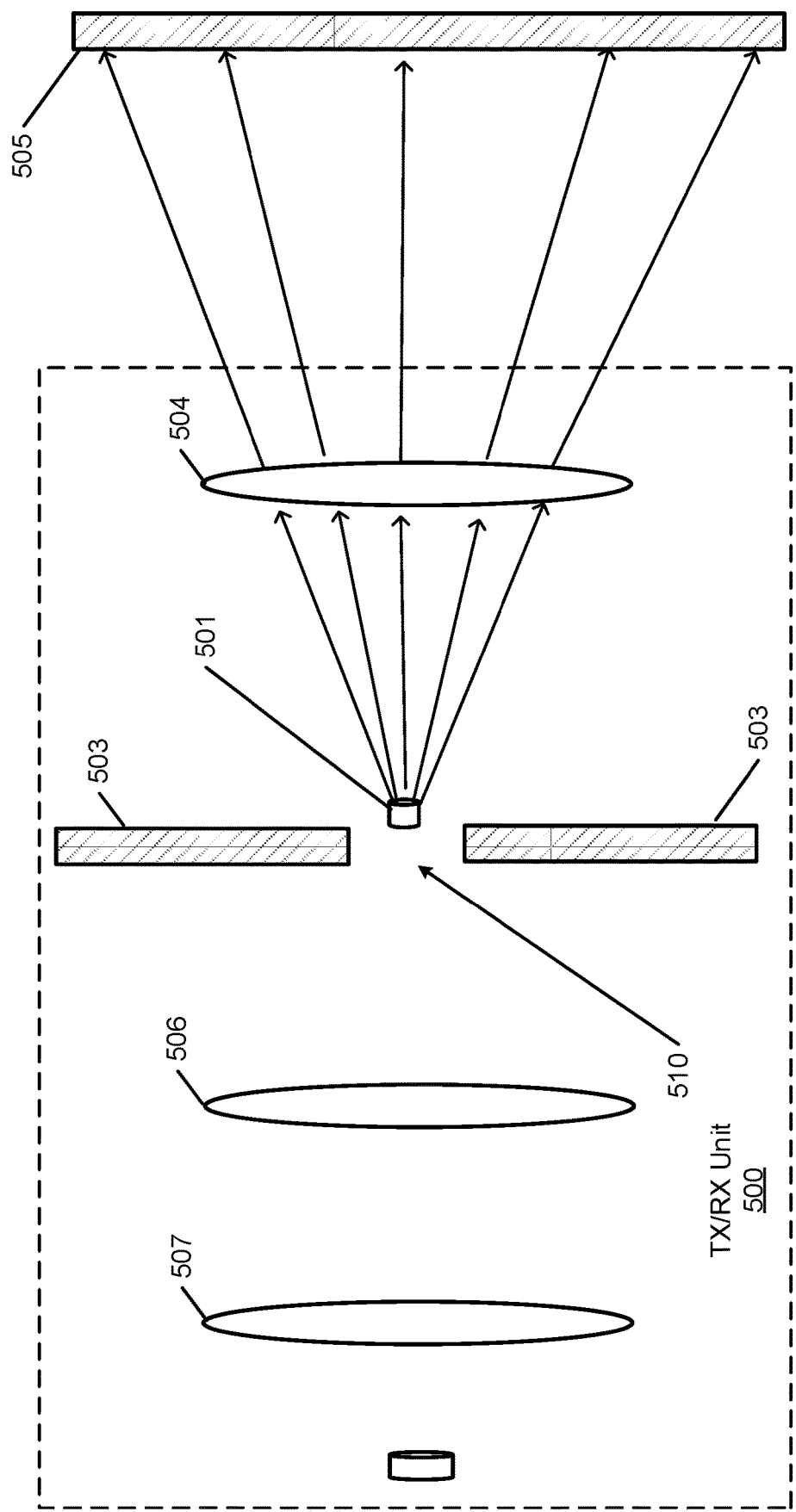
FIGS. 6A and 6B show a light transmitting path and a light receiving path respective according to certain embodiment.
Figure 6B:
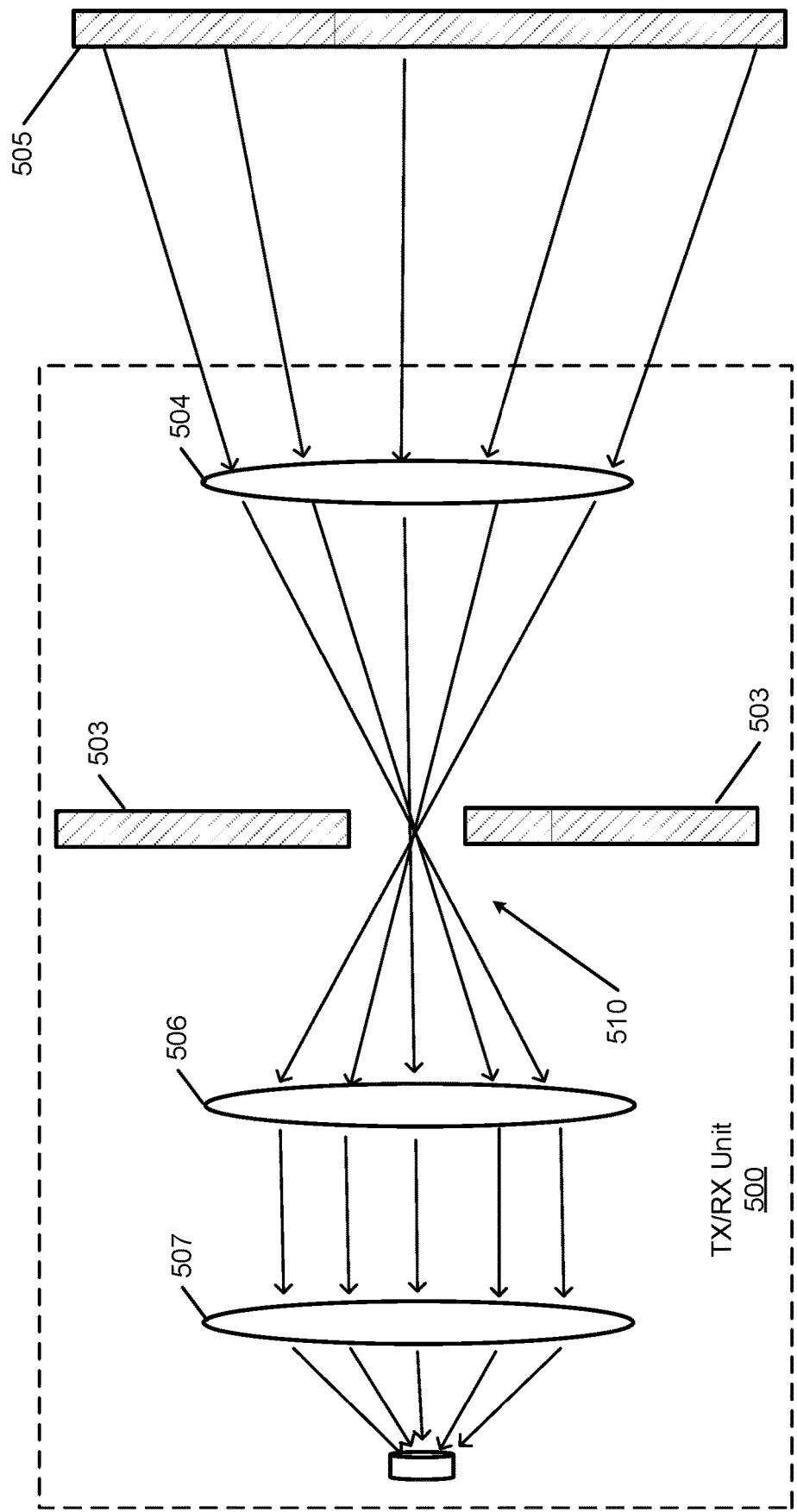

According to one embodiment, mounting board 503 includes a light pass-through opening 510 and the light emitter 501 is mounted adjacent to the light pass-through opening 510. The light pass-through opening 510 can be in any form or shape such as circular, rectangular, etc. The light emitter 501 is configured to emit a light beam towards the target 505 according to a transmitting path as shown in FIG. 6A. The light detector 502 is positioned behind the mounting board 503 to receive at least a portion of the light beam reflected from the target 505 through the light pass-through opening 510 according to a light receiving path as shown in FIG. 6B. In one embodiment, light emitter 501 is positioned adjacent to light pass-through opening 510, such that the light transmitting path and the light receiving path are substantially in parallel and close to each other (i.e., sharing the same path).

In one embodiment, TX/RX unit 500 further includes a first collimating lens 504 disposed between the target 505 and the light emitter 501. A collimator is a device that narrows a beam of particles or waves. To narrow can mean either to cause the directions of motion to become more aligned in a specific direction (i.e., make collimated light or parallel rays), or to cause the spatial cross section of the beam to become smaller (beam limiting device). In optics, a collimator may consist of a curved mirror or lens with some type of light source and/or an image at its focus. This can be used to replicate a target focused at infinity with little or no parallax.

Referring back to FIG. 5, first collimating lens 504 is configured to diverge the light beam from the light emitter 501 towards the target 505 as shown in FIG. 6A. The first collimating lens 504 is further configured to collapse at least a portion of the reflected light beam received from the target 505 as shown in FIG. 6B, such that the reflected light beam can pass through the light pass-through opening 510 to reach the light detector 502. By using collimating lens 504 to concentrate or focus the received light at light pass-through opening 510, such a design can also enable the light pass-through opening 510 to be made smaller.

In one embodiment, each light TX/RX unit 500 further includes a second collimating lens 506 positioned between the mounting board 503 and the light detector 502. The second collimating lens 506 is configured to receive the reflected light from the first collimating lens 504 through the pass-through opening 510 of the mounting board 503 and to transform the reflected light from various angles to parallel light towards the light detector 502. According to a further embodiment, light TX/RX unit 500 further includes a third collimating lens 507 positioned between the second collimating lens 506 and the light detector 502. The third collimating lens 507 is configured to collapse the light received from the second collimating lens 506 to concentrate and focus onto the light detector 502. As a result, the size of light detector 502, as well as the entire TXRX unit 500, can be made in a smaller size.

Figure 7:
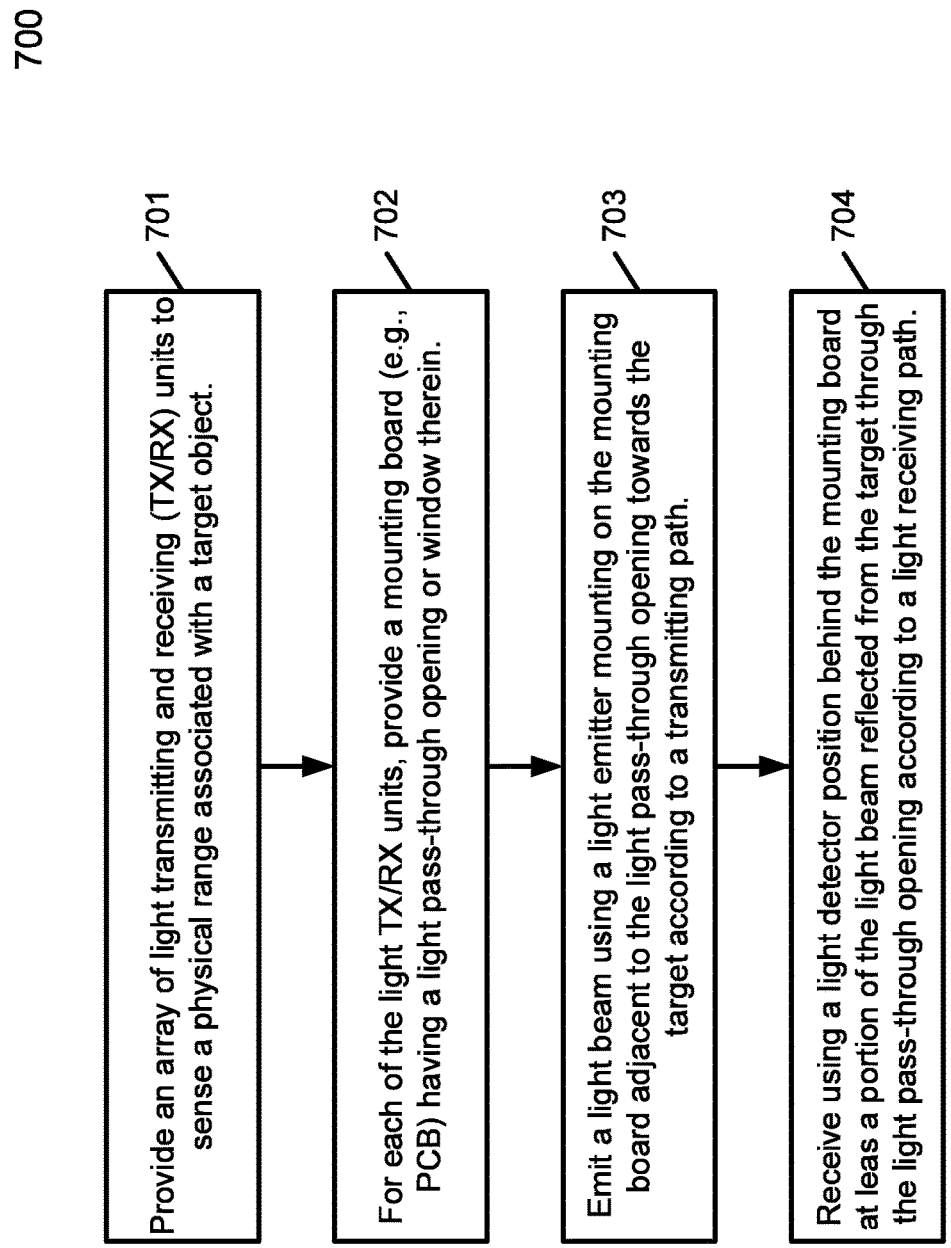
FIG. 7 is a flow diagram illustrating a process of operating a LIDAR device according to one embodiment.

FIG. 7 is a flow diagram illustrating a process of operating a LIDAR device according to one embodiment. Process 700 may be performed by processing logic which may include software, hardware, or a combination thereof. Referring to FIG. 7, in operation 701, an array of light TX/RX units is provided to sense a physical range associated with a target. Each TX/RX includes at least one light emitter and at least one light detector. For each of the TX/RX units, a mounting board is provided to mount a corresponding light emitter. The mounting board includes a light pass-through opening or window thereon. In operation 703, the light emitter emits one or more light beams towards the target according to a transmitting path. The light emitter is mounted on the mounting board adjacent to or near/overlapped with the light pass-through opening, such that the transmitting path and the receiving path are substantially in parallel and close to each other. In operation 704, the light detector is configured to receive at least a portion of the light beams reflected from the target through the light pass-through opening according to a light receiving path. The light detector is positioned behind the mounting board.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A light detection and range (LIDAR) device utilized in an autonomous driving vehicle, the LIDAR device comprising:
an array of light transmitting and receiving (TX/RX) units arranged to sense a physical range associated with a target, wherein each of the light TX/RX units comprises:
a mounting board having a light pass-through opening,
a light emitter mounted on the mounting board adjacent to the light pass-through opening, wherein the mounting board is a printed circuit board (PCB) including a circuitry coupling the light emitter to a LIDAR controller, wherein the light emitter is configured to emit a light beam towards the target according to a light transmitting path,
a light detector positioned behind the mounting board to receive at least a portion of the light beam reflected from the target through the light pass-through opening according to a light receiving path, wherein the light transmitting path and the light receiving path are substantially in parallel and close to each other,
a first collimating lens to diverge the light beam from the light emitter towards to the target, and to receive and focus a reflected light beam to pass through the light pass-through opening,
a second collimating lens, and
a third collimating lens, wherein the first collimating lens is disposed between the mounting board and the target, wherein the mounting board is positioned behind the first collimating lens, wherein the second collimating lens positioned behind the mounting board, wherein the third collimating lens is positioned behind the second collimating lens, and wherein the light detector is positioned behind the third collimating lens.

2. The LIDAR device of claim 1, wherein each TX/RX unit further comprises the first collimating lens disposed between the light emitter and the target.

3. The LIDAR device of claim 1, wherein the second collimating lens is configured to receive the reflected light beam from the first collimating lens from a spread form and to transform the reflected light beam to a parallel form.

4. The LIDAR device of claim 1, wherein the third collimating lens is configured to receive the reflected light beam from the second collimating lens and to collapse the reflected light beam to concentrate onto the light detector.

5. An autonomous driving vehicle, comprising:
a light detection and range (LIDAR) device, where in the LIDAR device comprises an array of light transmitting and receiving (TX/RX) units arranged to sense a physical range associated with a target, wherein each of the light TX/RX units comprises:
a mounting board having a light pass-through opening,
a light emitter mounted on the mounting board adjacent to the light pass-through opening, wherein the mounting board is a printed circuit board (PCB) including a circuitry coupling the light emitter to a LIDAR controller, wherein the light emitter is configured to emit a light beam towards the target according to a light transmitting path,
a light detector positioned behind the mounting board to receive at least a portion of the light beam reflected from the target through the light pass-through opening according to a light receiving path, wherein the light transmitting path and the light receiving path are substantially in parallel and close to each other,
a first collimating lens to diverge the light beam from the light emitter towards to the target, and to receive and focus a reflected light beam to pass through the light pass-through opening,
a second collimating lens, and
a third collimating lens, wherein the first collimating lens is disposed between the mounting board and the target, wherein the mounting board is positioned behind the first collimating lens, wherein the second collimating lens positioned behind the mounting board, wherein the third collimating lens is positioned behind the second collimating lens, and wherein the light detector is positioned behind the third collimating lens; and
a perception and planning system coupled to the LIDAR device to perceive a driving environment surrounding the autonomous driving vehicle based on LIDAR sensor data provided by the LIDAR device and to control the autonomous driving vehicle to navigate the driving environment.

6. The autonomous driving vehicle of claim 5, wherein each TX/RX unit further comprises the first collimating lens disposed between the light emitter and the target.

7. The autonomous driving vehicle of claim 5 wherein the second collimating lens is configured to receive the reflected light beam from the first collimating lens from a spread form and to transform the reflected light beam to a parallel form.

8. The autonomous driving vehicle of claim 5, wherein the third collimating lens is configured to receive the reflected light beam from the second collimating lens and to collapse the reflected light beam to concentrate onto the light detector.

9. A machine-implemented method for operating a LIDAR device of an autonomous driving vehicle, the method comprising:

providing an array of light transmitting and receiving (TX/RX) units to sense a physical range associated with a target; and for each of the light TX/RX units,
  providing a mounting board having a light pass-through opening,
  emitting a light beam using a light emitter mounted on the mounting board adjacent to the light pass-through opening, wherein the mounting board is a printed circuit board (PCB) including a circuitry coupling the light emitter to a LIDAR controller, wherein the light emitter is configured to emit the light beam towards the target according to a light transmitting path, and
  receiving using a light detector positioned behind the mounting board at least a portion of the light beam reflected from the target through the light pass-through opening according to a light receiving path, wherein the light transmitting path and the light receiving path are substantially in parallel and close to each other, wherein each TX/RX unit further comprises:
    a first collimating lens to diverge the light beam from the light emitter towards to the target, and to receive and focus a reflected light beam to pass through the light pass-through opening,
    a second collimating lens, and
    a third collimating lens, wherein the first collimating lens disposed between the mounting board and the target, wherein the mounting board is positioned behind the first collimating lens, and wherein the second collimating lens is positioned behind the mounting board, wherein the third collimating lens is positioned behind the second collimating lens, and wherein the light detector is positioned behind the third collimating lens.

10. The method of claim 9, wherein each TX/RX unit further comprises the first collimating lens disposed between the light emitter and the target.

11. The method of claim 9, wherein the second collimating lens is configured to receive the reflected light beam from the first collimating lens from a spread form and to transform the reflected light beam to a parallel form.

12. The method of claim 9, wherein the third collimating lens is configured to receive the reflected light beam from the second collimating lens and to collapse the reflected light beam to concentrate onto the light detector.

* * * * *